(12) United States Patent
Wallach

(10) Patent No.: US 11,544,069 B2
(45) Date of Patent: Jan. 3, 2023

(54) UNIVERSAL POINTERS FOR DATA EXCHANGE IN A COMPUTER SYSTEM HAVING INDEPENDENT PROCESSORS

(71) Applicant: Micron Technology, Inc., Boise, ID (US)

(72) Inventor: Steven Jeffrey Wallach, Dallas, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/170,799

(22) Filed: Oct. 25, 2018

(65) Prior Publication Data

US 2020/0133677 A1   Apr. 30, 2020

(51) Int. Cl.
| | | |
|---|---|---|
| *G06F 15/00* | (2006.01) | |
| *G06F 9/30* | (2018.01) | |
| *G06F 9/38* | (2018.01) | |
| *G06F 9/34* | (2018.01) | |
| *G06F 12/10* | (2016.01) | |

(52) U.S. Cl.
CPC ........ *G06F 9/3836* (2013.01); *G06F 9/30043* (2013.01); *G06F 9/34* (2013.01); *G06F 12/10* (2013.01); *G06F 2212/1008* (2013.01); *G06F 2212/657* (2013.01)

(58) Field of Classification Search
CPC ...... G06F 9/3836; G06F 9/30043; G06F 9/34; G06F 12/10
USPC .......................................................... 712/214
See application file for complete search history.

(56) References Cited

U.S. PATENT DOCUMENTS

| | | | |
|---|---|---|---|
| 4,445,177 | A | 4/1984 | Bratt et al. |
| 4,514,800 | A | 4/1985 | Gruner et al. |
| 4,525,780 | A | 6/1985 | Bratt et al. |
| 4,660,142 | A | 4/1987 | Clancy et al. |
| 4,821,184 | A | 4/1989 | Clancy et al. |
| 6,393,544 | B1 | 5/2002 | Bryg et al. |

(Continued)

FOREIGN PATENT DOCUMENTS

WO   2013174503   11/2013

OTHER PUBLICATIONS

International Search Report and Written Opinion, PCT/US2019/048006, dated Dec. 11, 2019.

(Continued)

*Primary Examiner* — Chun Kuan Lee
(74) *Attorney, Agent, or Firm* — Greenberg Traurig

(57) ABSTRACT

A system, method and apparatus to facilitate data exchange via pointers. For example, in a computing system having a first processor and a second processor that is separate and independent from the first processor, the first processor can run a program configured to use a pointer identifying a virtual memory address having an ID of an object and an offset within the object. The first processor can use the virtual memory address to store data at a memory location in the computing system and/or identify a routine at the memory location for execution by the second processor. After the pointer is communicated from the first processor to the second processor, the second processor can access the same memory location identified by the virtual memory address. The second processor may operate on the data stored at the memory location or load the routine from the memory location for execution.

18 Claims, 4 Drawing Sheets

(56) References Cited

U.S. PATENT DOCUMENTS

| | | | |
|---|---|---|---|
| 6,446,188 | B1 | 9/2002 | Henderson et al. |
| 7,149,878 | B1* | 12/2006 | Jensen .............. G06F 9/44547 |
| | | | 712/209 |
| 7,401,358 | B1* | 7/2008 | Christie .............. G06F 21/74 |
| | | | 711/163 |
| 8,635,412 | B1 | 1/2014 | Wilshire |
| 2002/0031135 | A1 | 3/2002 | Inoue |
| 2003/0140085 | A1 | 7/2003 | Moir et al. |
| 2004/0103213 | A1 | 5/2004 | Park |
| 2006/0136694 | A1* | 6/2006 | Hasbun .............. G06F 12/0284 |
| | | | 711/E12.013 |
| 2008/0250216 | A1 | 10/2008 | Kershaw et al. |
| 2009/0222654 | A1* | 9/2009 | Hum .............. G06T 1/20 |
| | | | 713/323 |
| 2009/0327613 | A1 | 12/2009 | Nutter et al. |
| 2009/0327617 | A1 | 12/2009 | Furuichi et al. |
| 2010/0118734 | A1 | 5/2010 | Weilnau, Jr. et al. |
| 2010/0228936 | A1* | 9/2010 | Wright .............. G06F 12/1009 |
| | | | 711/163 |
| 2010/0235598 | A1 | 9/2010 | Bouvier |
| 2011/0055528 | A1 | 3/2011 | Kondoh et al. |
| 2011/0314238 | A1* | 12/2011 | Finkler .............. G06F 9/544 |
| | | | 711/162 |
| 2012/0042144 | A1 | 2/2012 | Grisenthwaite |
| 2012/0254497 | A1 | 10/2012 | Ni et al. |
| 2013/0132695 | A1 | 5/2013 | Heo et al. |
| 2014/0025770 | A1 | 1/2014 | Warfield et al. |
| 2014/0244885 | A1* | 8/2014 | Tsirkin .............. G06F 13/4027 |
| | | | 710/306 |
| 2015/0046661 | A1* | 2/2015 | Gathala .............. G06F 12/023 |
| | | | 711/147 |
| 2015/0134945 | A1* | 5/2015 | Takami .............. G06F 9/4401 |
| | | | 713/2 |
| 2016/0210082 | A1 | 7/2016 | Frank et al. |
| 2016/0350019 | A1 | 12/2016 | Koufaty et al. |
| 2016/0381050 | A1 | 12/2016 | Shanbhogue et al. |
| 2017/0147505 | A1 | 5/2017 | Baxter et al. |
| 2017/0199815 | A1 | 7/2017 | Frank et al. |
| 2018/0191671 | A1 | 7/2018 | Choi et al. |
| 2019/0196983 | A1 | 6/2019 | Khosravi et al. |
| 2019/0339974 | A1 | 11/2019 | Wallach |
| 2020/0073822 | A1 | 3/2020 | Wallach |

OTHER PUBLICATIONS

International Search Report and Written Optinion, PCT/US2019/056819, dated Feb. 7, 2020.
Computer file, Wikipedia, printed on Oct. 12, 2018.
File system, Wikipedia, printed on Oct. 12, 2018.
Instruction set architecture, Wikipedia, printed on Oct. 16, 2018.
Memory address register, Wikipedia, printed on Jun. 26, 2018.
Memory address, Wikipedia, printed on Jun. 26, 2018.
Operating system, Wikipedia, printed on Apr. 18, 2018.
Pointer, Wikipedia, printed on Oct. 11, 2018.
Program counter, Wikipedia, printed on Jun. 26, 2018.
Reference, Wikipedia, printed on Oct. 12, 2018.
Steve Wallach, "128-Bit Addressing in RISC-V and Security", 5th RISC-V Workshop Proceedings, Nov. 2016.
The RISC-V Instruction Set Manual, vol. II: Privileged Architecture, May 7, 2017.
The RISC-V Instruction Set Manual, vol. I: User-Level ISA, May 7, 2017.
URL, Wikipedia, printed on Oct. 12, 2018.
Title: Static Identification in Object-based Memory Access, U.S. Appl. No. 16/028,840, filed Jul. 6, 2018, Inventor(s): Steven Wallach, Status: Docketed New Case—Ready for Examination, Status Date: Jan. 4, 2019.
Title: Security Configuration for Memory Address Translation from Object Specific Virtual Address Spaces to a Physical Address Space, U.S. Appl. No. 16/520,311, filed Jul. 23, 2019, Inventor(s): Steven Wallach, Status: Docketed New Case—Ready for Examination, Status Date: Aug. 23, 2019.
Extended European Search Report, EP19856112.8, dated Apr. 14, 2022.
Vilanova, Lluis, et al. "CODOMs: Protecting Software with Code-centric Memory Domains." IEEE, Jun. 14, 2014.
Lluis Vilanove, et al. "CODOMs: Protecting Software with Code-centric Memory Domains." ACM SIGARCH Computer Architecture news, vol. 42, Issue 3, Jun. 2014.

* cited by examiner

UNIVERSAL POINTERS FOR DATA EXCHANGE IN A COMPUTER SYSTEM HAVING INDEPENDENT PROCESSORS

RELATED APPLICATIONS

The present application relates to U.S. patent application Ser. No. 16/028,840, filed on Jul. 6, 2018 and entitled "Static Identifications in Object-based Memory Access," and U.S. patent application Ser. No. 16/028,750, filed on Jul. 6, 2018 and entitled "Securing Conditional Speculative Instruction Execution," the entire disclosures of which applications are hereby incorporated herein by reference.

FIELD OF THE TECHNOLOGY

At least some embodiments disclosed herein relate generally to computer architecture and more specifically, but not limited to, techniques for data exchange among computer programs executing in different computer processors.

BACKGROUND

A processor of a computer loads instructions for execution, loads operand for processing, and store results according to memory addresses in the processor. A memory address identifies a memory location in the computer. Memory addresses are fixed-length sequences of digits conventionally displayed and manipulated as unsigned integers. The length of the sequences of digits or bits can be considered the width of the memory addresses. Memory addresses can be used directly in certain structures of central processing units (CPUs), such as in program counters and in memory address registers, to load instructions and/or operands of the instructions for processing and/or to store processing results. The size or width of such structures of a CPU typically determines the memory address width.

A pointer is a programming language object that stores a memory address in computer memory. Conventionally, the actual format and content of a pointer variable is dependent on the underlying computer architecture. The applicable scope of a pointer is limited to a processor in which the program is running. A program running in a given computer may use pointers within the program to improve performances. A pointer in computer memory typically has the same width of the memory address registers in a Central Processing Unit (CPU). For example, manipulating the pointers can be more efficient than manipulating the data stored in the computer memory identified by the pointers.

Computers typically exchange data through computer files. For example, heterogeneous computers on the Internet can exchange data through files identified using web addresses or Uniform Resource Locators (URLs).

A computer file is a data storage facility organized in a file system of a computer. The file system controls how data of a file is stored in, and retrieved from, a data storage device according to a predefined standard. Operations of a file system are typically programmed in an operation system running in the processor(s) of a computer. The operating system is a set of instructions that manage the computer resources to provide common services, including the access to computer files in a data storage device of the computer.

A Uniform Resource Locator (URL) is a variable-length string of characters having multiple segments identifying various components of the URL. Examples of components of a URL include a communication protocol used to access the file at the URL through a computer network, a hostname identifying a computer on a computer network that controls the file, a file path of the file in the file system controlled by the computer, a file name of the file, etc.

BRIEF DESCRIPTION OF THE DRAWINGS

The embodiments are illustrated by way of example and not limitation in the figures of the accompanying drawings in which like references indicate similar elements.

DETAILED DESCRIPTION

The present disclosure includes the techniques of implementing universal pointers using object-based virtual memory addresses. The object-based virtual memory addresses can be translated into physical memory addresses by separate processors that may even have different Instruction Set Architecture (ISA). Thus, pointers based on object-based virtual memory addresses can be exchanged by computer programs running in different processors to exchange data without relying upon references to files. For example, a first processor running a first operating system (e.g., Windows) can access, via the Internet, data stored on a second processor running a second operating system (e.g., Linux), where the first and second processors can have different instruction sets.

Computer programs running in different computers may exchange data through computer files identified via Uniform Resource Locators (URLs). However, the processing of URLs to access data stored in computer files can be inefficient, involving multiple layers of software, such as operating systems, device drivers, and/or applications. The need for the multiple layers of software also increases the likelihood of security vulnerability.

When a universal pointer is implemented, computer programs running in different computers may exchange data through exchanging pointers. Such a pointer provides a virtual memory address that can be used in different computers to access the same memory location where the different computers can even have different underlying computer architecture. Thus, the use of such universal pointers can facilitate a memory centric programming paradigm, where different processors can be connected to a set of memory devices and/or storage devices to collaboratively process and/or operate on the data in the memory devices and/or storage devices. Processor hardware can be configured to translate virtual addresses provided by pointers to physical addresses for memory access. Such an arrangement can improve efficiency and/or security by removing the need for multiple layers of software conventionally used in processing file accesses.

Figure 1:
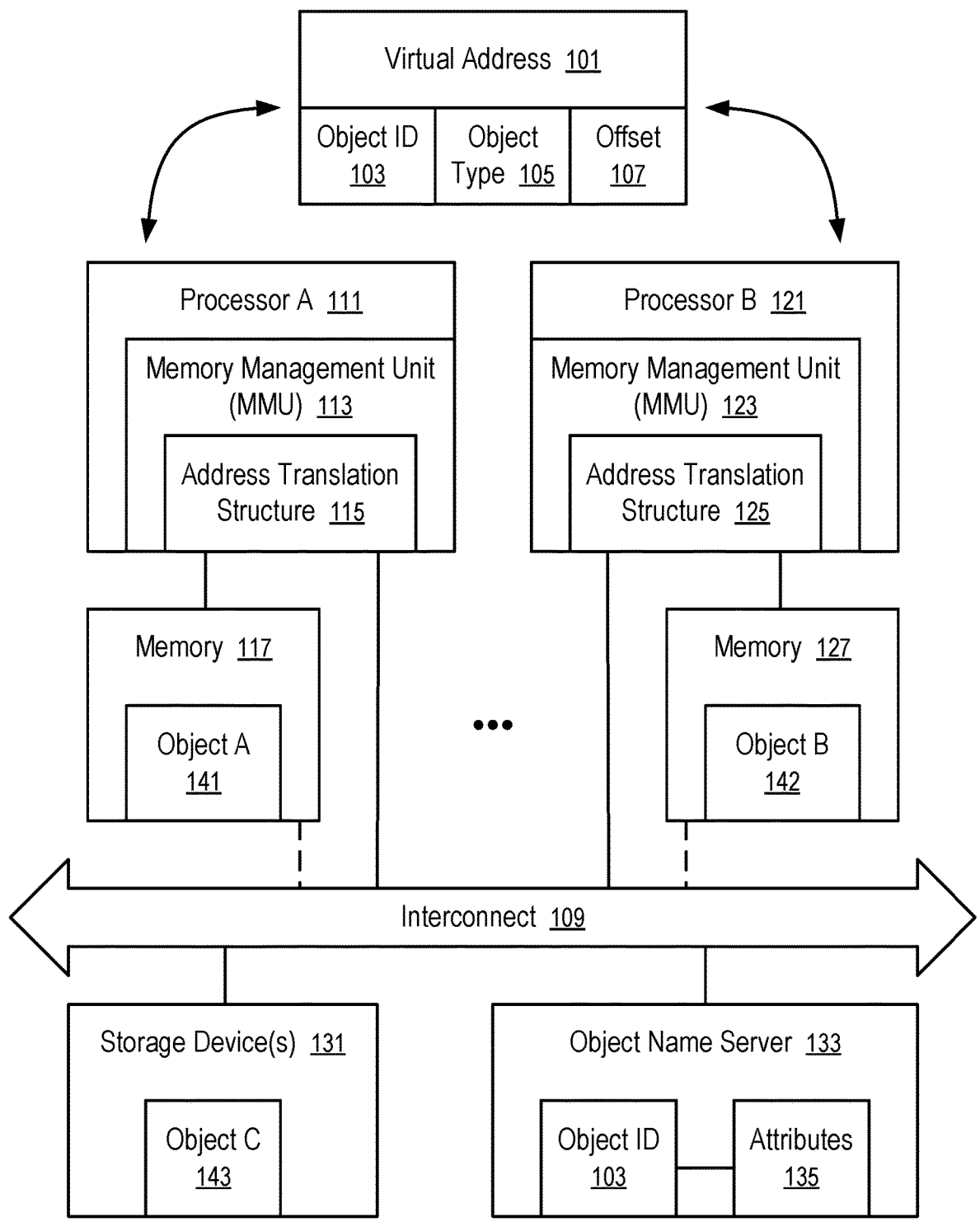
FIG. 1 shows a computer system configured to implement universal pointers using virtual memory addresses to facilitate data exchange among independent processors.

FIG. 1 shows a computer system configured to implement universal pointers using virtual memory addresses to facilitate data exchange among independent processors.

The computer system of FIG. 1 includes multiple processors (111, . . . , 121). In general, the processors (111, . . . , 121) can have different Instruction Set Architecture (ISA).

However, processors (111, ..., 121) having the same Instruction Set Architecture (ISA) can also be used.

In FIG. 1, the same virtual address (101) is usable in the different processors (111, ..., 121) to access a same memory location in the computer system of FIG. 1.

For example, the memory location can be in memory (117) coupled to the processor A (111), or in memory (127) coupled to the processor B (121), or in a storage device (131).

The computer system of FIG. 1 connects the processors (111, ..., 121), the memory (117, ..., 127), and the storage device(s) (131) via an interconnect (109), which can include wired or wireless links (e.g., local area network (LAN), wide area network (WAN), wireless local area network (WLAN), wireless wide area network (WWAN), etc.), one or more computer buses, one or more computer networks, network devices, and/or the Internet.

In some instances, the processor A (111) accesses the memory (127) coupled to the processor B (121) through communicating with the processor B (121). Alternatively, the memory (127) is also coupled to the interconnect (109) directly such that the processor A (111) can access the memory (127) without going through the processor B (121). In other instances, the processor B (121) also accesses the memory (127) through the interconnect (109).

Similarly, the processor B (121) may access the memory (117) coupled to the processor A (111) through communicating with the processor A (111), or access the memory (117) without going through the processor A (111) (e.g., when the memory (117) is also coupled to the interconnect (109) directly). In other instances, the processor A (111) also accesses the memory (117) through the interconnect (109).

Each of the processors (111, ..., 121) has a memory management unit (113, ..., or 123). The memory management unit (113, ..., or 123) has an address translation structure (115, ..., 125) that can convert the virtual address (101) into a physical address of a memory location and uses the physical address to access the memory location.

Thus, a program running in the processor A (111) may send, to a program running in the processor B (121), a pointer identifying the virtual address (101), allowing the program running in the processor B (121) to process the data identified using the virtual address (101), or to execute a routine at a location identified using the virtual address (101). Such an approach avoids the need for the program running in the processor A (111) to use the services of an operating system running in the processor A (111) to organize the data into a file, stored the file in a storage device (131) such that the program running in the processor B (121) may access the data in the file using the services of an operating system running in the processor B (121).

The virtual memory address (101) can have a predetermined width (e.g., a predetermined number of bits) for the processors (111, ..., 121). The memory address (101) can include a portion representing an object ID (103) and a portion representing an offset (107) within the object represented by the object ID (103). Optionally, the virtual address (101) and/or the object ID (103) of the virtual address can include a portion identifying an object type (105).

The virtual address (101) and/or the object represented by the object ID (103) can specify ISA semantics that can be implemented by different manufacturers of the processors (111, ..., 121).

For example, a static object ID of a predetermined value (e.g., 0) can be used to represent a kernel object of an operating system running in a processor (e.g., 111, ..., or 121). For improved security, a processor running instructions for the static object ID of the predetermined value (e.g., 0) do not perform conditional speculative execution during the execution of the instructions.

Some details and examples of static object IDs in memory addresses for computer processors to load instructions for execution can be found in U.S. patent application Ser. No. 16/028,840, filed Jul. 6, 2018 and entitled "Static Identifications in Object-based Memory Access," the entire disclosure of which application is hereby incorporated herein by reference.

Some details and examples of securing conditional speculative instruction execution based on static object IDs can be found in U.S. patent application Ser. No. 16/028,750, filed Jul. 6, 2018 and entitled "Securing Conditional Speculative Instruction Execution," the entire disclosure of which application is hereby incorporated herein by reference.

Preferably, the object ID (103), the object type (105), and the offset (107) have predetermined widths. Predetermined number of bits are used to represent the object ID (103), the object type (105), and the offset (107).

For example, each virtual address (101) has 128 bits in one embodiment. The virtual address (101) includes a 64-bit offset (107) and a 64-bit object ID (103). Optionally, the object ID (103) can include a predetermined number of bits representing a type (105) of the object (e.g., 141, ..., 143, or 143).

For example, an object type (105) of a value from 0 to 3 can be used to identify a kernel object of an operating system. For example, an object type (105) of a value of 4 to 5 can be used to specify that the offset is an address of different widths (e.g., a 64-bit address or 32-bit address included within the memory address that has 128 bits). For example, an object type (105) of a value of 6 to 7 can be used to specify that a predetermined portion of the object ID is to be interpreted as an identifier of a local object or an object in Partitioned Global Address Space (PGAS). For example, an object type (105) of a value of 32 can be used to specify that the remaining portion of the object ID is to be interpreted as an identifier of an object defined in a server (e.g., 197).

For example, the object represented by the object ID (103) can be the object A (141) in the memory (117) coupled to the processor A (111), or the object B (142) in the memory (127) coupled to the processor B (121), or the object C (143) in the storage device(s) (131).

In general, the object (141, ..., 142, ..., or 143) represented by the object ID (103) can include instructions configured for execution in at least one of the processors (111, ..., 121), and/or data to be manipulated by the instructions or by another program. The offset (107) can be used to identify a relevant portion of the object (141, ..., 142, ..., or 143), such as a starting address of instructions/routine to be executed, or a starting address of a data entry or table to be processed, etc.

For example, a processor (111, ..., or 121) can use the virtual address (101) in a program counter to load instructions of a routine of the object for execution. The object ID (103) and/or the object type (105) of the virtual address can be used to identify certain proprieties of the instructions and/or the routine for access control.

For example, a program running in a processor (111, ..., or 121) can use the virtual address (101) in a program counter to retrieve data of the object for processing.

The computer system of FIG. 1 can include an object name server (133) that provides information about objects (e.g., 141, ..., 142, ..., 143) identified by object IDs (e.g., 103) used in the virtual addresses (e.g., 101). For example, the object name server (133) can store data indicating the name of an object (e.g., 141, . . . , 142, . . . , or 143) represented by an object ID (103), access control parameters of the object (e.g., 141, . . . , 142, . . . , or 143), a current storage location/physical address of the object (e.g., 141, . . . , 142, . . . , or 143), a revision history of the object (e.g., 141, . . . , 142, . . . , or 143), a physical address of a cached copied of the object (e.g., 141, . . . , 142, . . . , or 143), a controller of the cached copied of the object (e.g., 141, . . . , 142, . . . , or 143), privileges for accessing the object (e.g., 141, . . . , 142, . . . , or 143), security configurations of the object (e.g., 141, . . . , 142, . . . , or 143), and/or other attributes (135) of the object.

An address translation structure (115, . . . , or 125) of a processor (111, . . . , or 121) may not have physical address information of all of the objects (141, . . . , 142, . . . , 143) at a particular time instance of operation.

For example, when the virtual address (101) is first constructed or used in the processor (111), the address translation structure (115) may not have the physical address of the object (e.g., 142, . . . , 143) represented by the object ID (103) specified in the virtual address (101). The address translation structure (115) can query the object name server (133) to obtain a physical address of the object (e.g., 142, . . . , 143) and thus configure the address translation structure (115) for the translation of the virtual address (101) into a physical address to access the memory location identified by the virtual address (101).

In some implementations, a communication protocol can be implemented on the interconnect (109) for the discovery of the physical address of an object (e.g., 142, . . . , 143) represented by an object ID (103). Thus, the object name server (133) can be effectively implemented via the communication protocol without a dedicated hardware; and the database of the object name server (133) can be distributed among the address translation structures (115, . . . , 125), the memory (117, . . . , 127), and/or the storage device(s) (131).

The object name server (133) can be either local to the computing system having the set of processors (111, . . . , 121) (e.g., connected via a computer bus or a local area network) or remote to the computing system (e.g., connected via a wide area network and/or the Internet).

Optionally, the computer system of FIG. 1 can move, or cache, an object from one location (e.g., in a storage device (131)) to another location (e.g., in memory (117, . . . , or 127)) for improved efficiency in access and/or processing. When the object is moved, or cached, the location information of the object can be updated in the object name server (133) and/or the address translation structures (115, . . . , 125) of the processors (111, . . . , 121).

Using pointers implemented using virtual addresses (e.g., 101) as illustrated in FIG. 1, heterogeneous processors (e.g., 111, . . . , 121) in a computer system can exchange data freely without the need for middle layers of software for processing files and/or URLs.

Figure 2:
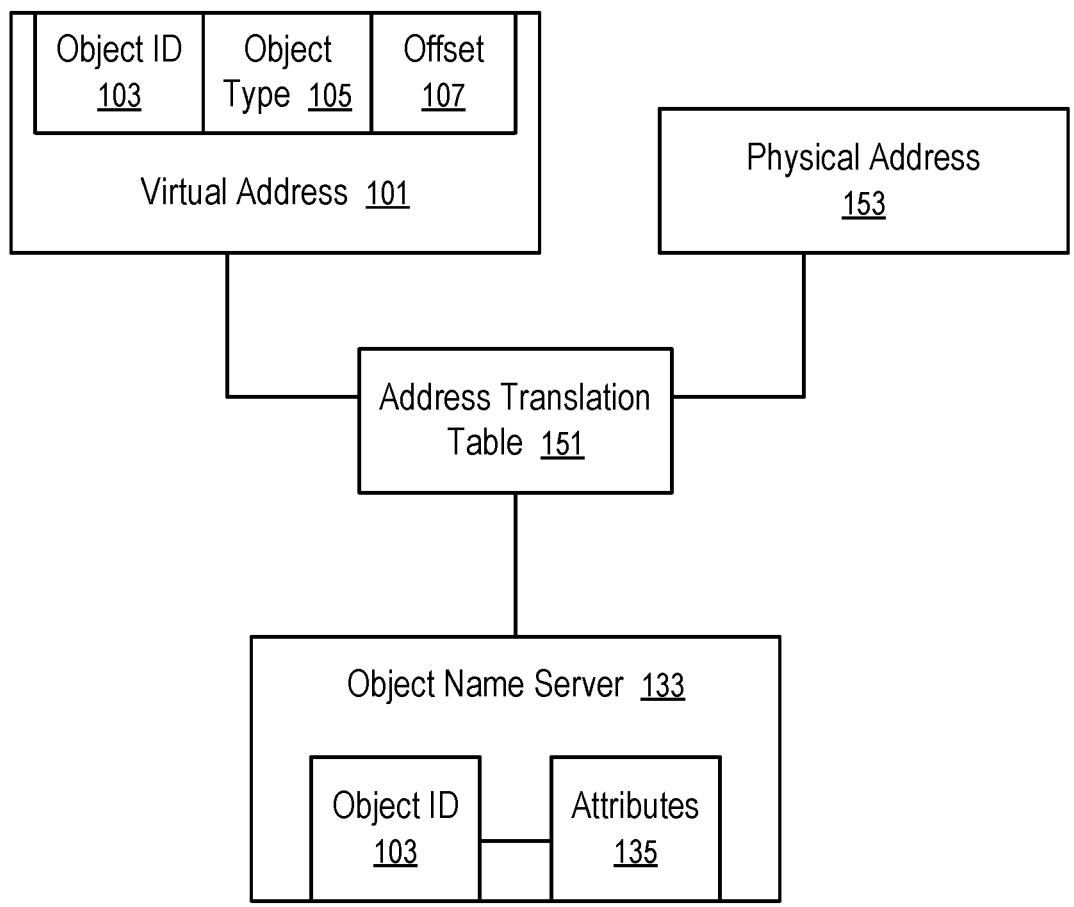
FIG. 2 illustrates the translation of a universal virtual address to a physical address.

FIG. 2 illustrates the translation of a universal virtual address (101) to a physical address (153).

In FIG. 2, an address translation table (151) is used to map the virtual address (101) to the physical address (153). The address translation table (151) can be implemented in an address translation structure (115, . . . , or 125) of a memory management unit (113, . . . , or 123).

The address translation table (151) can include address information initially stored in, or identified by, the object name server (133).

For example, the attributes (135) of the object name server (133) can include a physical memory address of the object ID (103), or an entry point of a mapping data structure for converting the addresses of the object. Based on the physical memory address of the object ID (103), entries for mapping different portions of the object (e.g., 141, . . . , 142, . . . , 143) represented by the object ID (103) can be calculated and populated in the address translation table (151).

For example, the attributes (135) of the object name server (133) can include a physical memory address for accessing entries configured to mapping different portions of the object (e.g., 141, . . . , 142, . . . , 143) represented by the object ID (103). The physical memory address can be used to load the entries into the address translation table (151).

Figure 3:
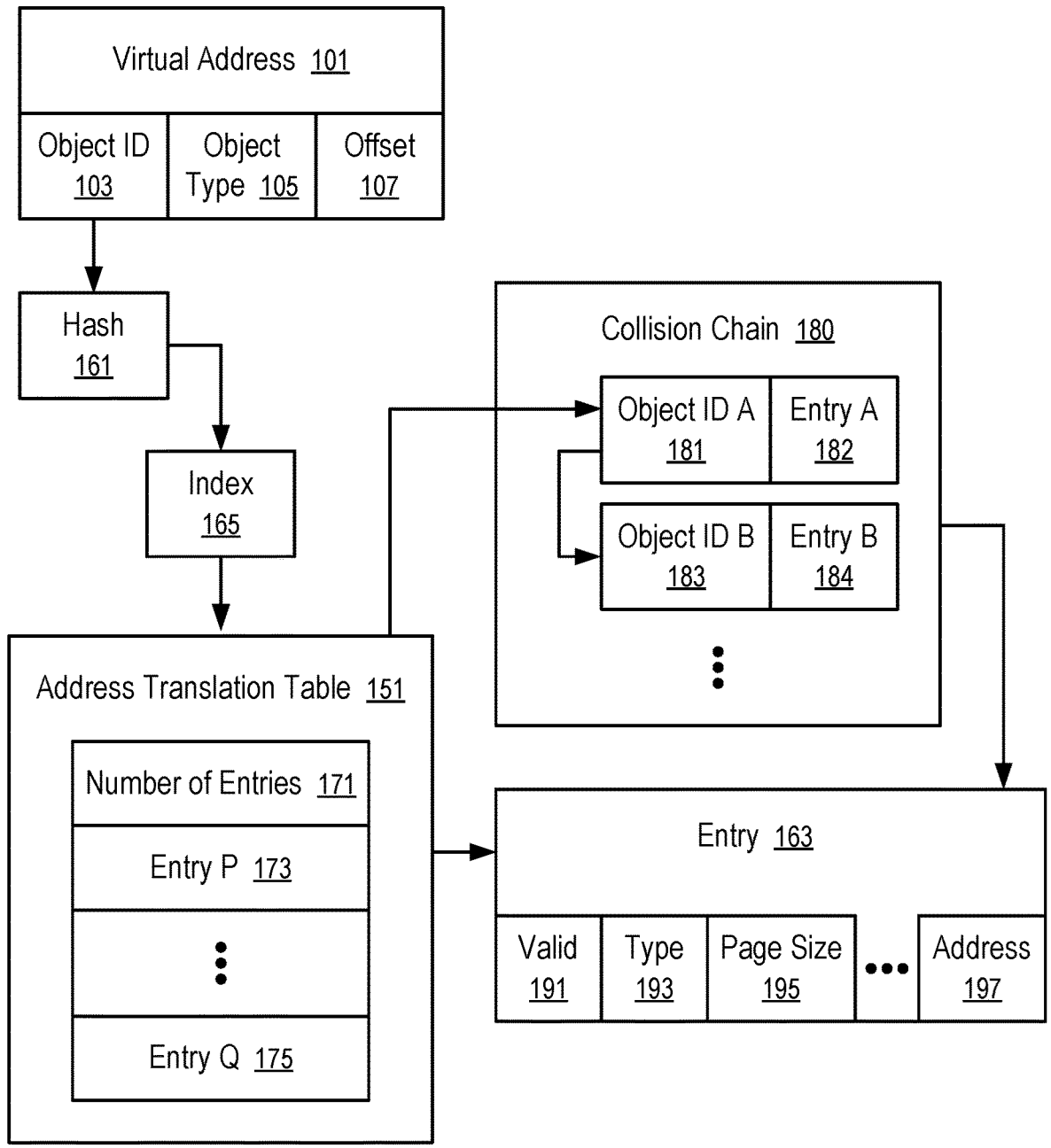
FIG. 3 illustrates an example of the translation of a universal virtual address to a physical address.

FIG. 3 illustrates an example of the translation of a universal virtual address (101) to a physical address (153).

The virtual address (101) can include an object ID (103), an object type (105), and an offset (107). For example, the virtual address (101) can have a width of 128 bits; a number of bits (e.g., 59 or 58) of the virtual address (101) can be used to store the object ID (103), another number of bits (e.g., 5 or 6) of the virtual address (101) can be used to store the object type (105), and the remaining bits (e.g., 64) of the virtual address can be used to store the offset (107) relative to the object (e.g., 141, . . . , 142, . . . , 143) that has the type (105) and the ID (103). For example, the virtual address (101) can be an address stored in the memory (117, . . . , 127), as configured, programmed, and/or seen by a programmer or user of a routine. The virtual address (101) can be the content of a universal pointer used by the programmer or user.

In FIG. 3, a hash (161) is applied on the object ID (103) to generate an index (165). The index (165) has a less number of bits than the object ID (103) and thus reduces the size of the address translation table (151) for looking up an entry (e.g., 173, . . . , 175) from the table (151) that is implemented in an address translation structure (115, . . . , or 125) of a processor (111, . . . , or 121). The size of the address translation table (151) corresponds to the number or count (171) of entries in the table (151).

However, hash collision can occur when multiple items are hashed into a same index. Chaining is one of the techniques to resolve hash collisions. The index resulting from a collision can be used to retrieve a list/chain of key-value pairs. Each item that is hashed into the index can be configured as the key in a corresponding key-value pair in the list; and the look up result for the item can be configured as the value in the corresponding key-value pair. To retrieve the look up result of one of the items that are hashed into the same index, the list/chain of key-value pairs identified via the index can be searched to find a key-value pair where the key matches with the item. The value of the matching key-value pair provides the look up result.

When there is no hash collision for the index (165), the entry (e.g., 173, . . . , or 175) at the index (165) in the address translation table (151) can be retrieved as the resulting entry (163).

When there is hash collision for the index (165), the entry (e.g., 173, . . . , or 175) at the index (165) in the address translation table (151) identifies a collision chain (163). The collision chain (163) has a list/chain showing the entries (e.g., 182, 184, . . . ) for the object IDs (e.g., 181, 183) that are hashed (161) into the same index (165). The collision chain (163) can be searched to locate the entry (e.g., 182, or 184) that is specified for an object ID (e.g., 181 or 183) that matches with the object ID (103) before the hash (161). The located entry (e.g., 182, or 184) is illustrated as the resulting entry (163).

In general, the hash (161) can be applied to a combination of the object ID (103), and optionally the object type (105) and/or a portion of the offset (107).

A typical entry (163) looked up from the address translation table (151) using the index (165) can have fields for subsequent operations in address translation (235).

For example, a valid field (191) can have a value indicating whether the entry (163) is a valid for address translation; a type field (193) can have a value indicating a type of translation to be performed using the entry; a page size field (195) can have a value indicating the memory page size for the determination of a page table entry; an address field (197); etc.

For example, the entry (163) can further include a field identifying the page table structure, and/or a field specifying security configuration for accessing the memory region corresponding to the entry (163).

Alternatively, the entry (163) can further include a field identifying a table; and a hash of the offset (107) or a portion of the offset (107) can be used as an index in the table to retrieve an entry that identifies a page table structure, or a base (157) of a region (137) of physical addresses (153), or the physical address (153) corresponding to the virtual address (101).

Optionally, the entry (163) can further include a bounds length field for checking the validity of the offset (107) provided in a virtual memory address (101). During the translation of the virtual memory address (101) into a physical memory address (153), the offset (107) is compared to the bounds length identified in the entry (163). If the offset (107) is greater than the bounds length, the virtual memory address (101) is invalid; the memory access made using the virtual memory address (101) is aborted; and a fault occurs.

The address (197) provided in the entry (163) of the address translation table (151) can be a physical memory address of a page table or page directory. At least a portion of the offset (107) can be used as a virtual page number and an index in the page table or page directory to look up the next page table or page directory. The process of looking up the next page table or page directory can be repeated, until an entry looked up using the last virtual page number in the offset (107) is used to locate a page table entry. A base (157) of a physical memory page identified in the page table entry can be combined with the remaining portion of the offset (107) to generate a physical address (153).

Optionally, the hash (161) can be applied to the entire virtual address (101) such that the address (197) looked up using the index (165) is a physical address. In such an implementation, the entry (163) can be considered as a page table entry and can include security configuration for the memory address. However, such an implementation can require a large address translation table (151).

Alternatively, the hash (161) can be applied to a combination of the object ID (103), optionally the object type (105), and a portion of the offset (107); and the address (197) looked up using the index (165) is a base of a page of physical addresses. The remaining portion of the offset (107) can be combined with the base to generate the physical address (e.g., 153). In such an implementation, the address translation table (151) can be considered as a page table; the portion of the address (101) used to generate the index (165) from hashing (161) can be considered an entry ID or a virtual page number (VPN); and the entry (163) can be considered as a page table entry and can optionally include a security configuration for the memory address.

Alternatively, the hash (161) can be applied to a combination of the object ID (103), optionally the object type (105), and a portion of the offset (107); and the address (197) in the entry (163) looked up using the index (165) is the physical address of a page table. Since the entry (163) identifies a page table, the portion of the address (101) used to generate the index (165) from hashing (161) can be considered a table ID. A portion of the offset (107) can be used as an entry ID (145) or a virtual page number (VPN) in the page table to look up the page table entry that contains the base of a memory page or memory region; and the remaining portion of the offset (107) can be combined with the base to generate the physical address (153).

Alternatively, the hash (161) can be applied to a combination of the object ID (103), optionally the object type (105), and a portion of the offset (107); and the address (197) in the entry (163) looked up using the index (165) is the address of a page directory. The offset (107) can have one or more virtual page numbers for one or more page directories or page tables. A virtual page number (VPN) in the offset (107) is used to index into the page directory to look up the base of a subsequent page directory or page table. The last virtual page number (VPN) in the offset (107) is used to index into a page table to retrieve the page table entry containing the base of the memory region (137). In such an implementation, the leading portion of the address (101), including the virtual page number (VPN) before the last virtual page number (VPN) can be considered a table ID.

In some instances, when different object IDs are hashed to generate the same index (165), a collision chain (180) can be used to identify a unique address associated with each of the object IDs. In such a situation, the address (197) can be used to identify a table, list, or chain storing the collision chain (180), from which a unique entry (e.g., 182, or 184) for address translation for the object ID (103) can be located. The unique entry (e.g., 182, or 184) looked up from the collision chain (180) can have a structure similar to the entry (163) looked up directly from the address translation table (151) without collision.

Figure 4:
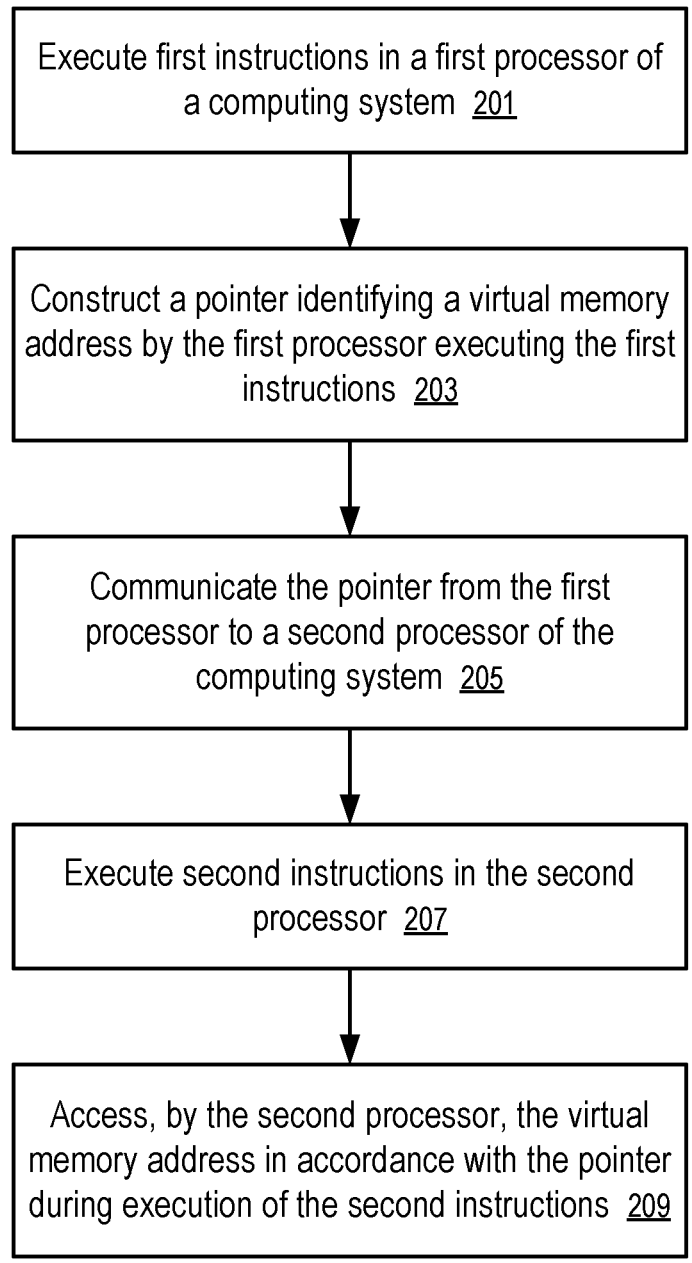
FIG. 4 shows a method of data exchange between processors using a universal pointer.

FIG. 4 shows a method of data exchange between processors using a universal pointer. For example, the method of FIG. 4 can be implemented in a computing system of FIG. 1. The universal pointer can be implemented to include a virtual address (101) illustrated in FIGS. 1, 2, and 3. The virtual address (101) can be translated into a same physical address (153) by the different processors (111, . . . , 121) using the object name server (133) of FIG. 2 and/or the address translation table (151) of FIG. 2 or FIG. 3.

At block 201, a first processor (111) of a computing system executes first instructions. The first instructions can be programmed to use a pointer.

At block 203, the first processor (111) constructs the pointer identifying a virtual memory address (101) during the execution of the first instructions.

For example, the virtual memory address (101) can have a predetermined number of bits (e.g., 128 bits). A first predetermined number of bits of the virtual memory address (101) represent an identifier (103) of an object (e.g., 141, . . . , 142, . . . , or 143); and a second predetermined number of bits (e.g., 64 bits) represents a memory location offset (107) within the object (e.g., 141, . . . , 142, . . . , or 143). Since the object (e.g., 141, . . . , 142, . . . , or 143) is known global within the computing system, the memory location identified by the virtual memory address (101) is independent of any particular processor (111, . . . , or 121) in the computing system.

For example, an object name server (133) in the computing system can be used to provide information about the location of the object (e.g., 141, . . . , 142, . . . , or 143) that is represented by the object identifier (103). Thus, any processor (111, . . . , or 121) in the computing system can access the same memory location identified via the offset (107) relative to the object (e.g., 141, . . . , 142, . . . , or 143). Different processors (111, . . . , 121) may access the same memory location via different communication paths that may involve communication methods.

At block 205, the first processor (111) communicates the pointer to a second processor (121) of the computing system.

For example, the first processor (111) and the second processor (121) can have different instruction set architecture (ISA), or optionally the same ISA.

For example, the pointer can be communicated from the first processor (111) to the second processor (121) via a computer network, a computer bus, and/or the Internet.

Since the virtual memory address (101) is universally valid in the computing system and not specific to the first processor (111) where the virtual memory address (101) is identified, created or used, the pointer having the virtual memory address (101) can be used in any of the processors (111, . . . , 121) in the computing system to access the same memory location.

The first processor (111) can provide data to and/or obtain data from the second processor (121) via the pointer, or request the second processor (121) to execute a routine identified by the pointer.

For example, the first processor (111) can store a computing result at a physical memory address (153) corresponding to the virtual memory address (101), during the execution of the first instructions. After communicating the pointer to the second processor (121), the second processor (121) can further operate on the result generated by the first processor (111). Further, the first processor (111) can subsequently access the processing result generated by the second processor (121) at the virtual memory address (101).

For example, the first processor (111) can identify, configure, or generate instructions of the object (141, . . . , 142, . . . , or 143) for execution by the second processor (121); and the first processor (111) can provide the pointer identifying the entry point of the instructions to the second processor (121) and request the second processor (121) to execute the instructions of the object (141, . . . , 142, . . . , or 143).

At block 207, the second processor (121) executes second instructions. The second instructions may or may not be part of the object (141, . . . , 142, . . . , or 143) identified by the virtual memory address (101) of the pointer.

At block 209, the second processor (121) accesses the virtual memory address (101) in accordance with the pointer during execution of the second instructions.

For example, a memory management unit (123) of the second processor (121) can convert the virtual memory address (101) into a physical memory address (153) using an address translation structure (115) that has an address translation table (151).

The memory management unit (123) can access the physical memory address (153). For example, when the virtual memory address (101) is in a program counter of the second processor (121), the memory management unit (123) can load an instruction from the physical memory address (153) into the second processor (121) for execution.

For example, when the virtual memory address (101) is in a memory address register of the second processor (121) during the execution of an instruction that operates on an operand identified by the memory address, the memory management unit (123) can load the operand from the physical memory address (153) into the second processor (121) for processing during the execution of the instruction.

The memory location identified by the virtual memory address (101) can be in the memory (117) of the first processor (111), a memory (127) of the second processor (121), or a storage device (143) in the computing system.

In some instances, an object can have different portions stored in different memory (e.g., 117, . . . , 127) and/or storage devices (131). A set of address translation entries can be used to locate the address map(s) for the translation of virtual memory addresses (e.g., 101) in the different portions to the respective physical memory addresses (e.g., 153).

In some instances, the memory management unit (e.g., 113, . . . , or 123) of a processor (e.g., 111, . . . , or 121) communicates with an object name server (133) of the computing system to configure its address translation structure (e.g., 115, . . . , or 125) such that the address translation structure can translate virtual addresses (e.g., 101) having the identifier (103) of the object (141, . . . , 142, . . . , or 143) to physical addresses (e.g., 153).

For example, when address information of an object (141, . . . , 142, . . . , or 143) is not already in the address translation table (151) of an address translation structure (e.g., 115, . . . , or 125), the address translation structure (e.g., 115, . . . , or 125) can communicate with the object name server (133) (and/or other address translation structures in the computing system) to retrieve one or more entries (e.g., 173, . . . , or 175) for the translation of virtual addresses of the object (141, . . . , 142, . . . , or 143). The retrieved the entries can be populated into the address translation table (151) according to the hash (161) and/or collision chain (180) implemented respective processor. Once the entries (e.g., 173, . . . , or 175, or 182 or 184 when there is a hash collision) are configured for the object ID (103), the translation of the virtual address (101) into the physical address (153) can be performed as illustrated in FIG. 3. Different processors (111, . . . , 121) may set up their address translation table (151) differently. However, the same virtual address (101) is translated into the physical address (153) for accessing the same memory location in the computing system. Thus, the processors (111, . . . , 121) can use the pointer having the virtual address (101) to facilitate data exchange and/or sharing.

Some objects can use a same static object ID when the objects are not configured to be shared among different processors. For example, kernel objects of an operating system running in a processor (111) may not be shared with another processor (121). Thus, the different processors (111) can use the same static object ID (e.g., 0) for the kernel objects located in different memory locations in the computing system. Such a technique also improves data security and/or reduces security vulnerability.

The techniques disclosed herein can be applied to at least to computer systems where processors are separated from memory and processors communicate with memory and storage devices via communication buses and/or computer networks. Further, the techniques disclosed herein can be applied to computer systems in which processing capabilities are integrated within memory/storage. For example, the processing circuits, including executing units and/or registers of a typical processor, can be implemented within the integrated circuits and/or the integrated circuit packages of memory media to performing processing within a memory device. Thus, a processor (e.g., 101) as discussed above and illustrated in the drawings is not necessarily a central processing unit in the von Neumann architecture. The processor can be a unit integrated within memory to overcome the von Neumann bottleneck that limits computing performance as a result of a limit in throughput caused by latency in data moves between a central processing unit and memory configured separately according to the von Neumann architecture.

The description and drawings of the present disclosure are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A method, comprising:
executing, in a first processor of a computing system, first instructions, the first instructions configured to use a pointer identifying a virtual memory address used in the first processor;
communicating the pointer from the first processor to a second processor of the computing system during execution of the first instructions, wherein the second processor is separate and independent from the first processor, and the first processor and the second processor have different instruction set architecture (ISA);
communicating with an object name server of the computing system to configure an address translation structure of a memory management unit of the second processor to translate virtual addresses having an identifier of an object to physical addresses; and
executing second instructions in the second processor, the second instructions configured to access the virtual memory address using the pointer received from the first processor;
wherein the virtual memory address has a predetermined number of bits, including a first predetermined number of bits representing the identifier of the object and a second predetermined number of bits representing a memory location offset within the object;
wherein the first instructions executed in the first processor constructs the pointer to identify a memory location in the computing system; and the second processor uses the virtual memory address to access the memory location in the computing system; and
wherein the memory location is coupled to and accessible to the second processor while the memory location is accessible to the first processor via communication with the second processor.

2. The method of claim 1, wherein the pointer is communicated from the first processor to a second processor via a computer network.

3. The method of claim 1, wherein the memory location is in a memory of the second processor or a storage device in the computing system.

4. The method of claim 1, further comprising:
converting, by the memory management unit of the second processor, the virtual memory address into a physical memory address; and
accessing, by the memory management unit, the physical memory address.

5. The method of claim 4, further comprising:
loading an instruction from the physical memory address into the second processor; and
executing the instruction in the second processor.

6. The method of claim 4, further comprising:
loading an operand from the physical memory address into the second processor in response to the virtual memory address being in a register in the second processor; and
executing an instruction on the operand in the second processor.

7. The method of claim 6, further comprising:
storing, by the first processor, a computing result at the physical memory address using the virtual memory address during the execution of the first instructions, wherein the computing result is the operand in the executing the instruction in the second processor.

8. The method of claim 4, wherein the virtual memory address has 128 bits; and
the memory location offset has 64 bits.

9. The method of claim 1, wherein the first processor is running a first operating system and the second processor is running a second operating system different from the first operating system.

10. The method of claim 9, wherein the first operating system is Linux and the second operating system is Windows.

11. The method of claim 9, wherein the first operating system is Windows and the second operating system is Linux.

12. A non-transitory computer storage medium storing first instructions which, when executed in a first processor of a computing system, cause the first processor to perform a method, the method comprising:
executing, in the first processor of the computing system, the first instructions;
constructing, by the first processor, a pointer identifying a virtual memory address accessible by the first processor;
communicating the pointer from the first processor to a second processor of the computing system during execution of the first instructions; and
communicating with an object name server of the computing system to configure an address translation structure of a memory management unit of the second processor to translate virtual addresses having an identifier of an object to physical addresses;
wherein the second processor is separate and independent from the first processor and the first processor and the second processor have different instruction set architecture (ISA);
wherein during execution of second instructions in the second processor, the second processor accesses the virtual memory address according to the pointer received from the first processor;
wherein the virtual memory address has a predetermined number of bits, including a first predetermined number of bits representing the identifier of the object and a second predetermined number of bits representing a memory location offset within the object;

wherein the first instructions executed in the first processor constructs the pointer to identify a memory location in the computing system; and the second processor uses the virtual memory address to access the memory location in the computing system using the pointer; and wherein the memory location is coupled to and accessible to the second processor while the memory location is accessible to the first processor via communication with the second processor.

13. The non-transitory computer storage medium of claim 12, wherein the pointer is communicated from the first processor to a second processor via a computer network.

14. The non-transitory computer storage medium of claim 13, wherein the virtual memory address has 128 bits, including the identifier of the object and a 64-bit memory location offset relative to the object.

15. A non-transitory computer storage medium storing instructions which, when executed in a computing system having a first processor and a second processor that is separate and independent from the first processor and the first processor and the second processor have different instruction set architecture (ISA), cause the computing system to perform a method, the method comprising:

receiving, in the second processor, a pointer from the first processor, wherein during execution of first instructions in the first processor, the first processor generates the pointer identifying a virtual memory address accessible by the first processor;

communicating, by a memory management unit of the second processor, with an object name server of the computing system to configure an address translation structure of the memory management unit to translate virtual addresses having an identifier of an object to physical addresses;

executing, in the second processor, second instructions; and accessing, by the second processor in accordance with the pointer, the virtual memory address during execution of the second instructions in the second processor, wherein the virtual memory address has a predetermined number of bits, including a first predetermined number of bits representing the identifier of the object and a second predetermined number of bits representing a memory location offset within the object;

wherein the first instructions executed in the first processor constructs the pointer to identify a memory location in the computing system; and the second processor uses the virtual memory address to access the memory location in the computing system using the pointer; and wherein the memory location is coupled to and accessible to the second processor while the memory location is accessible to the first processor via communication with the second processor.

16. The non-transitory computer storage medium of claim 15, the method further comprising:

converting, by the memory management unit of the second processor, the virtual memory address into a physical memory address; and accessing, by the memory management unit, the physical memory address.

17. The non-transitory computer storage medium of claim 16, wherein the accessing of the physical memory address includes loading, from the physical memory address, an instruction of the object or an operand of an instruction operating on the object.

18. The non-transitory computer storage medium of claim 16, the method further comprising:

communicating, by the memory management unit of the second processor, with the object name server of the computing system to retrieve the memory location of the object in the computing system; and configuring the address translation structure of the memory management unit using the memory location retrieved from the object name server, wherein the converting of the virtual memory address into the physical memory address is performed using the address translation structure configured using the memory location.

* * * * *